United States Patent [19]
Hoshina et al.

[11] 3,708,736
[45] Jan. 2, 1973

[54] CONTROL SYSTEM FOR CORRECTING ERRORS IN THE POSITION OF A WORK ARTICLE MAKING A LINEAR MOTION BY MEANS OF A DRIVE SCREW

[75] Inventors: Naomi Hoshina, Yokohama; Etsuji Suzuki, Kawasaki, both of Japan

[73] Assignee: Tokyo Shibaura Electric Co., Ltd., Kawasaki-shi, Japan

[22] Filed: July 9, 1971

[21] Appl. No.: 161,128

[30] Foreign Application Priority Data

July 10, 1970 Japan..................................45/59848

[52] U.S. Cl..................................................318/632
[51] Int. Cl............................................G05d 23/275
[58] Field of Search.......................................318/632

[56] References Cited

UNITED STATES PATENTS 3,289,061   11/1966   Stratman..............................318/632
3,586,951   6/1971   Inaba et al............................318/632
2,927,258   3/1960   Lippel..............................318/632 X Primary Examiner—Benjamin Dobeck
Attorney—Kemon, Palmer & Estabrook

[57] ABSTRACT

A control system wherein a work article or load, such as a work table, is made to travel linearly by a drive screw; and the position of said work article is determined by a servo system including comparing an amount of control corresponding to the rotation angle of the drive screw with a predetermined value of input supplied to the system. There are detected errors in the position of the work article resulting from the drive screw by a reference screw disposed parallel with the travelling direction of the work article so as to operate interlockingly with the drive screw in combination with a displacement detector mounted on the work article so as to operate interlockingly with the reference screw. There are supplied output signals from the displacement detector to the servo system to correct errors in the position of the work article.

5 Claims, 3 Drawing Figures

3,708,736

CONTROL SYSTEM FOR CORRECTING ERRORS IN THE POSITION OF A WORK ARTICLE MAKING A LINEAR MOTION BY MEANS OF A DRIVE SCREW

BACKGROUND OF THE INVENTION

This invention relates to an automatic control of machine tools or manufacturing machines and more particularly to a servo system for automatically correcting the position of a work article or load, such as a work table, made to travel linearly by a servomotor to an extent corresponding to a predetermined value of input supplied thereto.

There have heretofore been proposed as a result of development of various types of machine tools or manufacturing machines a large number of systems for automatically determining the position of a work article. These automatic positioning systems may be broadly classified into a screw drive type and an oil pressure cylinder drive type. However, the latter type has a complicated control mechanism and raises problems in respect of the accuracy of control.

The drive unit of the screw drive control system may consist of an electric servomotor, electric pulse motor, oil pressure servomotor, or oil pressure pulse motor. According to this type of control system, the drive screw is made to rotate through a predetermined angle upon receipt of an input electric pulse, that is, detection of only the rotation angle of the drive screw enables the position of a work article to be determined without directly detecting its position (open loop control servo system). This control system is widely accepted due to its simple mechanism.

With the aforementioned drive screw system, the precision with which to form the threads of the drive screw has a direct bearing on the accuracy of determining the position of a work article. The deformation, wear or thermal expansion of the threads of the drive screw under the load of a work article and the cumulative pitch errors of the threads largely affect the accuracy of locating the work article, possibly leading to errors in its position.

Particularly with large machine tools, a work article applies a heavy load on the drive screw eventually to reduce its useful life. Since a drive screw manufactured with high precision is extremely expensive, its frequent replacement is not economical.

SUMMARY OF THE INVENTION

It is accordingly the object of the invention to provide a control system for correcting errors in the position of a work article made to travel linearly by a drive screw, which are caused by the drive screw.

According to this invention a reference screw is disposed parallel with the travelling direction of a work article so as to operate interlockingly with a drive screw; and a displacement detector is fitted to the work article so as to detect errors in the position of the work article resulting from the drive screw by comparing the actual travel of the work article with that which should be expected from the rotation of the reference screw. Errors in the position of the work article can be corrected by supplying output signals from the displacement detector to a servo system.

DESCRIPTION OF THE PREFERRED EMBODIMENTS

Figure 1:
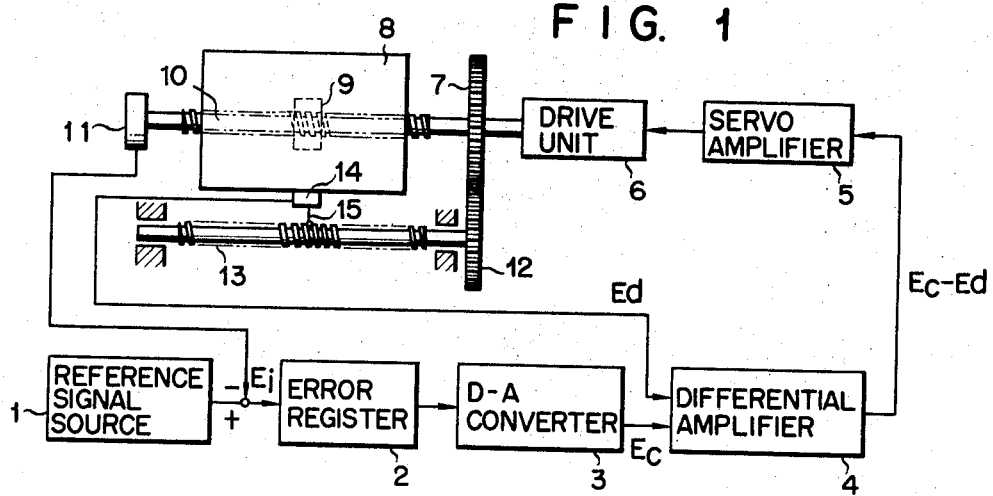
FIG. 1 is a schematic block diagram of a control system according to an embodiment of this invention.

FIG. 1 represents an open loop control servo system according to an embodiment of this invention which determines the position of a work article by detecting only the rotation angle of a drive screw.

Reference numeral 1 denotes a source of reference signals for generating digital signals, such as electric pulses according to a preset input value previously recorded on a magnetic tape or perforated tape. Digital signals from the source of reference signal 1 are supplied through an error register 2 to a digital-to-analog converter 3 (hereinafter referred to as a "D-A converter") to convert a digital quality indicated by electric pulses to an analog quantity. Analog signals obtained by the conversion are supplied through a differential amplifier 4 to a servo amplifier 5, output from which actuates a drive unit 6, for example, an electric servomotor or oil pressure servomotor. The output shaft of the drive unit 6 rotates a drive screw 10 and causes a work article or load, such as a work table, 8 to travel linearly through a nut 9. At this time, the drive unit 6 also rotates a precision or reference screw 13 through gears 7 and 12. The reference screw 13 is disposed, as indicated in FIG. 1, parallel with the drive screw 10, namely, parallel with the travelling direction of a work article.

Each time the drive screw 10 rotates through a predetermined angle, a rotation detector 11 generates an electric pulse. The rotation detector 11 may be constituted by a disk having a plurality of slits perforated at an equal space along the periphery and designed to rotate with the drive screw and a light source and a photoelectric conversion element disposed on the opposite sides of the perforated peripheral portion of the disk. Output pulse signals from the rotation detector 11 are compared with the predetermined value of input signals from the source of reference signals 1 to cause the work article to be shifted until a difference $E_i$ between the output and input signals, namely, output from the error register 2 is reduced to zero. A difference between the actual travel of the work article 8 and that of the reference screw 13 can be detected in the form of electric signals representing an analog quantity by bringing upon the aforesaid shifting a contact member 15 of a displacement detector 14 such as an electric micrometer fitted to the work article 8 into contact with the reference screw 13 interlockingly operable with the drive screw 10 through the gears 7 and 12.

With the pitch of the threads of the drive screw 10 and that of the precision or reference screw 13 designated as $P$ and $Po$ respectively, the numbers $Z$ and $Zo$ of teeth of the gears 7 and 12 should bear the following ratio:

$$Z/Zo = P/Po$$

Now let is be assumed that the work article 8 stands at rest, there is not generated any output from the displacement detector 14 and the reference screw 13 is free from fabrication errors. When, under such condition, the drive screw 10 rotates through a given angle to cause the work article 8 to travel, output from the displacement detector 14 indicates any errors in the position of the work article 8 that would result from the cumulative pitch and deformation of the threads of the drive screw 10. When, therefore, output signals $Ed$ representing the errors are supplied to the differential amplifier 4 to produce a difference $E_c-Ed$ between output Ec from the D-A converter 3 and the aforesaid error output signals $Ed$, and the operation of the drive unit 6 is so controlled as to bring the difference to zero or a predetermined value, then errors in the position of the work article originating with the drive screw 10 can be corrected.

The foregoing description relates to the case where output from the displacement detector 14 was supposed to be zero at the initial state. Generally, however, even when output from the displacement detector 14 indicates other values than zero, errors in the position of a work article resulting from the drive screw 10 can be corrected by controlling output from the differential amplifier 4 so as to indicate zero or a predetermined value.

Figure 2:
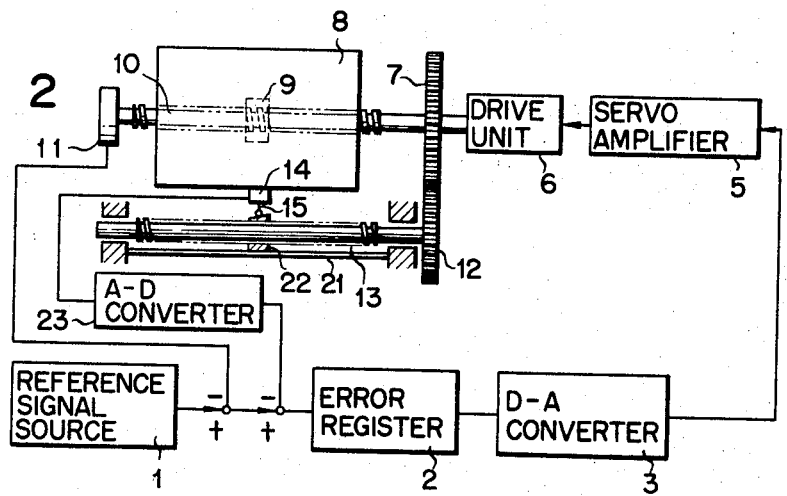
FIG. 2 is a schematic block diagram of a control system according to another embodiment of the invention.

FIG. 2 shows another embodiment of this invention whose mechanism and operation are substantially the same as in FIG. 1. The same parts of FIG. 2 as those of FIG. 1 are denoted by the same numerals. Coupling of the displacement detector 14 such as electric micrometer fitted to the work article with the reference screw 13 is effected as shown in FIG. 3 by a cam 22 engaged with the reference screw 13 and prevented from rotation, for example, by a guide rod 21, and the contact member 15 of the displacement detector 14 contacting a measurement surface of the cam 22.

Electric signals representing errors in the position of the work article 8 are continuously generated by the displacement detector 14 in the form of an analog quantity. The analog signals are converted to digital signals by an analog-to-digital converter 23. The resultant digital signals are collated with the previously provided values obtained by comparing digital signals from the rotation angle detector 11 with the predetermined values of input, thereby correcting errors in the position of the work article caused by drive screw 10.

The displacement detector is not limited to the aforesaid electric micrometer, but may consist of an air type, magnetic type or capacitive type detector. These detectors are well known in the art. The air type detector, or air micrometer measures a compression quantity which corresponds to the variation of width of a gap defined by a nozzle of the micrometer supplied with compressed air and a measurement surface on which the compressed air blows of a cam as shown in FIG. 3. As the magnetic type detector, a type which is called "-Nultrax" or "Delpax" (trade marks) may be used.

Figure 3:
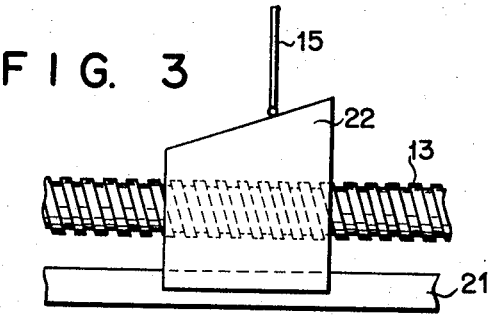
FIG. 3 is an enlarged view of the cam section of FIG. 2.

The capacitive type detector measures the variation of capacitance defined by two electrodes, one of which being fitted to the detector while the other being disposed on a measurement surface of a cam as shown in FIG. 3. Where there is used an oil pressure motor as a drive unit, the servo amplifier of FIGS. 1 and 2 is replaced by a servo valve.

What we claim is:

1. A control system for acurately defining the position of a work article comprising:
    drive means for causing the work article to travel linearly by a drive screw;
    said drive screw having a first degree of lead screw error;
    a rotation angle detecting means for producing signals corresponding to the angle through which said drive screw is made to rotate by said drive means;
    a servo system for determining the position of the work article by collating said output signals from said detection means with the predetermined values of input;
    a reference screw disposed parallel with the traveling direction of said work article and arranged to operate interlockingly with said drive screw;
    said reference screw having a degree of lead screw error less than the degree of lead screw error of said drive screw;
    a displacement detector fitted to said work article for engaging said reference screw so as to detect errors in said work article position caused by the difference of lead screw error between said drive screw and said reference screw;
    means for correcting said errors according to output signals from said displacement detector whereby said work article is caused to travel linearly at a constant velocity.

2. The control system according to claim 1 wherein said servo system comprises an error register adapted to receive signals denoting a difference between the values of output from said rotation angle detecting means and the predetermined values of input;
    a digital-to-analog converter for converting a digital quantity from said error register to an analog quantity; and
    a differential amplifier connected to said converter and displacement detector so as to actuate said drive unit according to the resultant output.

3. The control system according to claim 1 wherein the servo system comprises an analog-to-digital converter for converting an analog quantity from said displacement detector to a digital quantity;
    an error register adapted to receive values obtained by collating the values of output from said analog-to-digital converter with the values previously provided by comparing the values of output from said rotation angle detector with the prescribed values of input; and
    a digital-to-analog converter for converting a digital quantity from said error register to an analog quantity so as to actuate said drive unit according to the resultant output.

4. The control system according to claim 1 wherein said displacement detector is an electric micrometer provided with a contact member which directly contacts said reference screw.

5. The control system according to claim 1 wherein said displacement detector is an electric micrometer provided with a contact member which contacts a cam unrotatively engaging the reference screw.

* * * * *